(12) United States Patent
Zhang et al.

(10) Patent No.: US 11,406,057 B2
(45) Date of Patent: Aug. 9, 2022

(54) MULTI-SCALE HABITAT INFORMATION-BASED METHOD AND DEVICE FOR DETECTING AND CONTROLLING WATER AND FERTILIZER FOR CROPS IN SEEDLING STAGE

(71) Applicant: JIANGSU UNIVERSITY, Jiangsu (CN)

(72) Inventors: Xiaodong Zhang, Jiangsu (CN); Hanping Mao, Jiangsu (CN); Hongyan Gao, Jiangsu (CN); Zhiyu Zuo, Jiangsu (CN); Yixue Zhang, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 380 days.

(21) Appl. No.: 16/646,369

(22) PCT Filed: Dec. 19, 2017

(86) PCT No.: PCT/CN2017/117190
§ 371 (c)(1),
(2) Date: Mar. 11, 2020

(87) PCT Pub. No.: WO2019/109384
PCT Pub. Date: Jun. 13, 2019

(65) Prior Publication Data
US 2021/0289692 A1    Sep. 23, 2021

(30) Foreign Application Priority Data

Dec. 5, 2017   (CN) .......................... 201711269626.2

(51) Int. Cl.
*A01C 21/00* (2006.01)
*G01D 21/02* (2006.01)

(52) U.S. Cl.
CPC ........... *A01C 21/007* (2013.01); *G01D 21/02* (2013.01)

(58) Field of Classification Search
CPC ............................. A01C 21/007; G01D 21/02
See application file for complete search history.

(56) References Cited

U.S. PATENT DOCUMENTS

| 2007/0065857 A1* | 3/2007 | Glaser ................ G01N 21/3563 |
| | | 435/6.12 |
| 2007/0289207 A1* | 12/2007 | May ........................ A01G 9/16 |
| | | 47/17 |

(Continued)

FOREIGN PATENT DOCUMENTS

| CN | 203773326 U | 8/2014 |
| CN | 104198396 A | 12/2014 |

(Continued)

*Primary Examiner* — Yoshihisa Ishizuka
(74) *Attorney, Agent, or Firm* — Saliwanchik, Lloyd & Eisenschenk

(57) ABSTRACT

A multi-scale habitat information-based method and device for detecting and controlling water and fertilizer for crops in seedling stage: performing fusion analysis on multi-scale features of the water and fertilizer stress of crops on the basis of crop canopy-scale three-dimensional laser scanning information, foliage-scale polarization-hyperspectral imaging information, and micro-scale micro-CT scanning information; combining the real-time feedback of the temperature, humidity, illumination and substrate moisture content within a crop growing greenhouse; by means of multi-information fusion modeling, comprehensively determining and feeding back the water and fertilizer stress of the crops as well as water requirement and fertilizer requirement information, and providing policy information for the amount of fertilization and irrigation. On the basis of the policy information for water and fertilizer, and on the basis of frequency conversion speed control technology and pipeline constant (Continued)

pressure control technology, a water and fertilizer control system controls the pressure of a pipeline and the flow rate of the fertilizer by means of dynamically controlling the rotation speed of an irrigation pump and a fertilizer pump, and thus, combined with the dynamic feedback of an EC value, the accurate control of a liquid fertilizer ratio and irrigation volume is achieved.

6 Claims, 3 Drawing Sheets

(56) References Cited

U.S. PATENT DOCUMENTS

2016/0334276 A1* 11/2016 Pluvinage ................. G01J 3/28
2020/0309687 A1* 10/2020 Fujiyama ............... A01G 25/16

FOREIGN PATENT DOCUMENTS

| | | |
|---|---|---|
| CN | 106664937 A | 5/2017 |
| CN | 107173184 A | 9/2017 |
| EP | 3135102 A1 | 3/2017 |
| WO | 2015092799 A1 | 6/2015 |

* cited by examiner

MULTI-SCALE HABITAT INFORMATION-BASED METHOD AND DEVICE FOR DETECTING AND CONTROLLING WATER AND FERTILIZER FOR CROPS IN SEEDLING STAGE

CROSS REFERENCE TO RELATED APPLICATIONS

This application is a National Stage Application of International Application Number PCT/CN2017/117190, filed Dec. 19, 2017; which claims priority to Chinese Application No. 201711269626.2, filed Dec. 5, 2017.

TECHNICAL FIELD

The present invention belongs to the technical field of biological information detection in protected agriculture, and relates to multi-scale habitat information-based method and device for detecting and controlling water and fertilizer for crops in seedling stage.

BACKGROUND ART

In China, the total area of planting facilities has reached 4.1 million hectares, but few researches have been made on water and fertilizer integration technology and equipment applicable to solar greenhouses and steel frame greenhouses. Imported water and fertilizer irrigation and application systems used in large-size modern greenhouses can achieve mixed application accurately and scientific management of multiple channels of fertilizers, but they are usually bulky, complex to operate and manage, involve high price, and are not suitable for ordinary farmers. While domestic small-scale fertilization systems employ an extensive water and fertilizer management pattern, and especially have a lack of information on crop nutrition and water demand. Therefore, they cannot realize fertilization and irrigation on demand and cannot achieve an objective of saving water and fertilizers; in addition, most of them have no fertilizer mixing, agitation, sedimentation and discharge devices, are prone to have sedimentation and blockage phenomena and have high failure rates.

Most of the water and fertilizer integration equipment of small-scale and medium-scale farmers are simple handheld irrigation devices, and the popularization rate of integrated water and fertilizer drip irrigation systems is relatively low among those fainters. The widely used handheld irrigation devices are not only managed in an extensive management model, causing serious waste of water and fertilizer resources and non-point source pollution, but also result in severe wastes of manpower and low labor efficiency. Owing to the frequent application of fertilizers and water in facilities, fruits and vegetables in the facilities are usually irrigated once every three or four days, and 1 to 2 days per person are required for each operation in a 10-mu greenhouse. Consequently, the manpower and labor costs are high, and the economic benefits of facility planting are poor.

In order to solve the problems in the production in solar greenhouses of medium-scale and small-scale fanners at present, such as low automation level of water and fertilizer irrigation and application, inaccurate regulation and control of water and fertilizer application without taking consideration of the actual demand, and quality decline of agricultural products and non-point source pollution incurred by extensive water and fertilizer application, etc., the present invention application provides a multi-scale habitat information-based method for detecting and controlling water and fertilizer for crops in seedling stage, which can be used to control the opportunity and volume of water and fertilizer irrigation according to the environment and crop information in a greenhouse; according to the requirements of planting agronomy in solar greenhouses, the applicant has developed a light-weight and simple water and fertilizer irrigation and application device, and makes the device more cost-effective and practical. The device can improve the utilization rate of water and fertilizers in solar greenhouses and reduce labor intensity, and is helpful for realizing efficient, continuous, and intensive development of precision agriculture.

Intelligent monitoring techniques for growing process of greenhouse crops have become a key link in greenhouse production. The water stress state of plants is an important basis for intelligent water and fertilizer management in greenhouses. Traditional plant nutrition and water detection methods, such as empirical detection method and chemical analysis, canopy-air temperature difference and image detection methods, etc., have problems such as high susceptibility to environmental interferences and low detection accuracy, etc., may lead to misjudgments easily, and cannot meet the requirements of modern facility production. The present invention fuses three-dimensional scanning and imaging technique as well as micro-CT scanning and imaging technique to accurately phenotype the internal and external macro and micro morphological differences among plants resulted from nutrition and water stress, utilizes polarization-hyperspectral imaging technique to detect the differences in apparent color, texture and polarization state among crops under nutrition and water stress, and, in combination with detection of soil moisture content, environmental temperature and humidity, and lighting information, realizes accurate detection of nutrition and water stress of crops by means of fusion and complementation of internal and external features at different scales, and, on that basis, carries out decision control for water and fertilizer irrigation and application. Therefore, the method and device provided in the present invention have great theoretical significance and application values for improving the technical level of intellectualization of greenhouse production for medium-scale and small-scale farmers.

CONTENTS OF THE INVENTION

The object of the present invention is to provide a multi-scale habitat information-based method and device for detecting and controlling water and fertilizer for crops in seedling stage, in order to realize rapid and non-destructive accurate detection of water and fertilizer stress state of crops in seedling stage as well as water and fertilizer decision making, so as to provide a basis for scientific management of water and fertilizer in facilities.

The above technical object of the present invention is attained with the following technical means:

A multi-scale habitat information-based method for detecting and controlling water and fertilizer for crops in seedling stage, including the following steps:
(1) Using a standard nutrient solution formulation, utilizing pearlite as a culture substrate, employing soilless cultivation to plant greenhouse vegetable crops, and managing the plants with standardized greenhouse management methods to ensure normal supply of nutrient elements and water to the crops in seedling stage;
(2) After one week of planting, selecting plants for sample cultivation under water stress and nitrogen stress;

(3) Carrying out continuous plant growth state detection and information acquisition of the samples in seedling stage under water stress and nutrition stress respectively through micro-CT scanning at micro-scale, polarization-hyperspectral imaging and scanning at leaf scale, and three-dimensional plant canopy scanning and imaging at canopy scale, and acquiring plant habitat information at the same time;

(4) Carrying out conventional physical and chemical detections: weighing dry and wet weight of the samples to determine the true value of water content in the plants; measuring the total nitrogen content in the samples with a Kjeldahl method; using SEM and 3D micro-imaging techniques with ultra-depth of field to obtain measured values of density of pore and cilia, thickness of cavernous body and palisade tissue, and distribution density of vascular bundle and diameter of fibrous canal, etc. of the plants;

(5) Carrying out normalization of the micro-CT feature variables, polarization-hyperspectral image feature variables, and three-dimensional scanning and imaging feature variables extracted in step (3), to unify the range of the feature values to 0 to 1;

(6) Carrying out feature dimension reduction and optimization of the normalized feature parameters extracted in step (5) by means of principal component analysis in combination with piecewise and stepwise regression method; based on a principle of correlation and independence, at a significance level $\alpha=0.005$, keeping a variable if $F>4.35$ when the variable is taken into the model, weeding out a variable if $F<2.95$ in the model during the discrimination, while maintaining $R^2>0.9$; carrying out feature optimization based on optimization principles of maximum correlation, minimum multi-collinearity, and minimum relative detection error, to obtain optimal feature variables as feature variables for diagnosis of water stress and nitrogen stress of the plants;

(7) Utilizing a support vector machine regression (SVR) method to carry out the fusion of feature layer, and establishing an accurate and quantitative nitrogen and water stress detection model with multi-feature fusion based on feature variables of the pores, cavernous body, palisade tissue, cilia, vascular bundle, volume of root system, density of main root and root hair acquired with the micro-CT system, the canopy width, plant height, leaf inclination angle, and distribution of leaf vein, average greyscale and shadow area of leaf margin at 560 nm and 1,450 nm hyperspectral water-sensitive wavelengths acquired with the polarization-hyperspectral imaging system, the polarization state, Stock vector, and Muller matrix variables of plants in the 560 nm and 1,450 nm feature images at 0°, 45°, 90°, 135°, and 180° characteristic polarization angles; and the feature variables of plant volume, leaf area, and stem diameter obtained by three-dimensional laser scanning, and inputting the accurate and quantitative nitrogen and water stress detection model with multi-feature fusion into a PLC control system;

(8) Using the temperature, humidity and light information of the plant growth environment and the information on water content in the substrate acquired in step (3) to perform statistics, analysis, and calculation of accumulative value of temperature and accumulative value of light since the time of planting, and, in combination with the information on water content in the substrate and environmental temperature, humidity and lighting information, calculating the transpiration of the plants; on that basis, carrying out tracking and continuous detection of nutrition and water stress of the crops on the basis of the acquired micro-CT images, polarization-hyperspectral image features, and optimal feature variables of three-dimensional laser scanning and imaging, to obtain a model of fertilization and irrigation amount for plants, and inputting the model into the PLC control system;

(9) Under a condition of constant pressure in the main pipeline, establishing a relation model between fertilization flow rate and fertilization amount, and between rotation speed of fertilization pump and fertilization flow rate, and inputting the relation model between fertilization flow rate and fertilization amount and between rotation speed of fertilization pump and fertilization flow rate into the PLC control system;

(10) Acquiring micro-CT images, polarization-hyperspectral image features, and feature parameters of three-dimensional laser scanning and imaging that characterize the growth state of the plants according to step (3), and judging the current state and degree of water stress and nitrogen stress of the plants with the PLC control system according to the accurate and quantitative nitrogen and water stress detection model with multi-feature fusion; then, utilizing the PLC to control the output frequency of the frequency converter and thereby controlling the rotation speed of the fertilization pump on the basis of the model of fertilization and irrigation amount, in combination with the relation model between fertilization flow rate and fertilization amount, and between rotation speed of fertilization pump and fertilization flow rate, to realize accurate regulation and control of fertilization mix ratio and irrigation volume.

Furthermore, the habitat information includes temperature, humidity, and light intensity information of the plant habitat in the greenhouse and information on water content in the culture substrate, and is acquired with temperature transmitter, humidity transmitter, light intensity transmitter, and water content transmitter.

Furthermore, the micro-CT detection at micro-scale includes the following steps:

(1) Placing plant samples on the rotating sample bracket in the sample chamber of the Micro-CT scanning system, starting the Micro-CT scanning system and carrying out scanning, to acquire CT profiles of the samples;

(2) Using IPL software to select the boundaries and contours in the CT images of the samples;

(3) Selecting different tomography sections for image analysis, adjusting the high and low thresholds according to the different grayscale levels of the target in the CT image, selecting a threshold range for the target, and binarizing the CT image of the target sample;

(4) Using the IPL software in combination with target image analysis to obtain feature parameters of the plant, including pore density of leaves and stems, thickness of cavernous body, density of palisade tissue and cilia, cross-sectional structure of vascular bundle, and grayscale of the CT image, etc.;

(5) Removing the pearlite substrate on the basis of the selected boundaries and thresholds, generating a three-dimensional image of the root system, and carrying out IPL language to export parameters including volume of root system, and density and distribution of main root and root hair.

Furthermore, the polarization-hyperspectral scanning and imaging detection at leaf scale includes the following steps:

(1) Placing samples on the double coordinate sample table of the polarization-hyperspectral imaging system, setting the wavelength range of the visible light-near infrared light source system 37 to 300 to 2,200 nm, setting the light intensity range to 6,500 lux, adjusting the geometrical center of the imaging system to be in line with the geometrical center of the displacement table in X-axis (horizontal axis) and Z-axis (vertical axis), and carrying out the scanning and imaging of polarization-hyperspectral image;

(2) Using two hyperspectral imaging systems with pre-polarization filters, and setting the sampling polarization angles of the polarization filters to 0°, 45°, 90°, 135°, and 180° respectively; using hyperspectral pre-filters with 560 nm and 1,450 nm transmission wavelengths, and performing push-broom polarization-hyperspectral scanning and imaging in the horizontal direction and the vertical direction respectively, to obtain front-view and top-view polarization-hyperspectral feature images;

(3) Extracting a hyperspectral feature images of the sample under nutrition and water stress in front view and top view fields, and extracting canopy width, plant height and leaf inclination angle images of the plant, by means of coordinate matching and front-view/top-view feature image fusion;

(4) Extracting a hyperspectral feature image of the canopy at the characteristic wavelength, extracting feature parameters such as distribution of leaf vein, average greyscale, and shadow area of leaf margin, etc. of the leaf surface at 560 nm and 1,450 nm hyperspectral nutrition and water sensitive wavelengths, based on the 560 nm and 1,450 nm pre-filters;

(5) Extracting the polarization state, Stock vector, and Muller matrix variables of the pant sample under nitrogen and water stress, based on the acquired 560 nm and 1,450 nm polarization-hyperspectral image at 0°, 45°, 90°, 135°, and 180° characteristic polarization angles.

Furthermore, the three-dimensional laser scanning and imaging detection at canopy scale includes the following steps:

(1) First, sticking black outline high-reflection target spots in 6 mm diameter above the crop leaves to be scanned and the planting vessel, with the minimum distance between every two target spots controlled to 20 mm when sticking the reflection target spots, in view that the surfaces of the leaves are curved;

(2) Operating the scanning system, using the three-dimensional laser scanner to measure a calibration plate to correct the parameters of sensors, so as to ensure the data acquisition accuracy;

(3) Finally, acquiring three-dimensional data of all crop samples sequentially by handheld scanning.

Furthermore, in the three-dimensional laser scanning and imaging detection process, the laser power is set to 65%, the shutter time is set to 7.2 ms, and the resolution is set to 0.50 mm.

A multi-scale habitat information-based device for detecting and controlling water and fertilizer for crops in seedling stage, including a fertilization mechanism, an information acquisition system and a control system.

The fertilization mechanism mainly includes a main water inflow pipeline, a filter, a water inflow pump, a water inflow solenoid valve, a fertilizer outflow pipeline, a fertilization solenoid valve, an agitating motor, a fertilizer mixing tank, a fertilization pump, and a fertilizer outflow pipe; wherein, one end of the main water inflow pipeline is connected to a water source, the other end of the main water inflow pipeline is connected to the filter, the water outlet of the filter is connected to the water inflow pump to provide a basic water source for the water and fertilizer supply system, the water inflow solenoid valve is connected between the outlet pipeline of the water inflow pump and the fertilizer mixing pipeline to control the connection/disconnection of the water source pipeline; the fertilization pump is connected to the top part of the fertilizer mixing tank through a pipeline, and a fertilization solenoid valve is arranged between them to realize the control of the connection/disconnection of the fertilization pipeline; the agitating motor is mounted on the top of the fertilization tank, and agitating blades are mounted on the tail end of the output shaft of the agitating motor and is driven by the motor to realize the operation of mixing and uniformly agitating the solid fertilizer particles;

The information acquisition system includes an environmental temperature transmitter, an environmental humidity transmitter, an environmental lighting transmitter, a substrate water content transmitter, an EC sensor, two pH sensors, a liquid level sensor, a pressure transmitter, a crop information detection system, and an A/D conversion analog input module; wherein, the environmental temperature transmitter, the environmental humidity transmitter, and the environmental lighting transmitter are mounted in the greenhouse, the substrate water content transmitter is mounted in the substrate in the crop pot, and the environmental temperature transmitter, the environmental humidity transmitter, the environmental lighting transmitter, and the substrate water content transmitter are connected to the analog module respectively; the EC sensor is connected in the pipeline of a fertilizer distributor to detect the concentration of the nutrient solution, and the output end of the EC sensor is connected to the input end of the analog input module; one of the two pH sensors is mounted at 10 cm from the liquid level in the fertilizer mixing tank and the other one is mounted at 20 cm from the bottom of the fertilizer mixing tank, and the two pH sensors are respectively connected to the input end of the analog module; by comparing the differences between the two pH sensors, the degree of homogeneity of fertilizer agitation is judged, the required rotation speed of the agitating motor is judged, and the agitating motor and the agitating device are started or stopped automatically; the liquid level sensor is arranged at the bottom of the fertilizer mixing tank, and the signal output end of the liquid level sensor is also connected to the input end of the analog module; the liquid level is judged based on a principle of pressure difference under water; the pressure transmitter is connected at the middle part of the main pipeline to judge the pressure in the main pipeline, and the output end of the pressure transmitter is connected to the input end of the analog module; the crop information detection system includes a micro-CT scanning system, a polarization-hyperspectral imaging system, and a three-dimensional laser scanning system;

The control system includes a PLC controller, a touch display screen, a frequency converter, and an actuator, wherein the touch display screen is connected to the PLC controller for man-machine interaction to input control mode and information on plant growth state; wherein the input end of the frequency converter is connected to the output end of the PLC controller, the output end of the frequency converter is connected to the fertilization pump, and the analog module is connected to the PLC controller, to realize the control of multi-channel information acquisition of the PLC controller on the information acquisition system;

According to the demand of the crop for water and fertilizers and environmental information, the system can realize frequency control of the frequency converter via the PLC controller, so as to control the rotation speed of the fertilization pump to adjust the flow rate in the fertilization pipeline, and finally realize accurate control of the fertilizer application and irrigation amount in the constant-pressure main pipeline.

Furthermore, in the micro-CT scanning system, a rotating sample bracket is fixed to the bottom of the detection sample chamber by screws on the base, a rotating shaft is mounted at the geometrical center of the base of the rotating sample bracket, a round sample bracket is mounted and fixed on the tail end of the rotating shaft; in the detection process, the rotating shaft drives the sample bracket to rotate within 360° range, and an X-ray emitter fixed to the middle part of the emission chamber accomplishes a sectional slice scanning process of the sample by means of pitching actions.

Furthermore, the polarization-hyperspectral image detection system includes a control system, a double coordinate sample table, an image acquisition system, and a light source system;

Wherein the image acquisition system includes two polarization-hyperspectral imaging systems, an image acquisitor, a vertical arm, and a cantilever; the vertical arm consists of a first base, a vertical pole with a lead screw, and a first slide block, wherein the first base is fixed to the left side of the bottom of a light box by screws, the top part of the first base is connected to the vertical pole via a hinge, and the vertical pole can sway left and right using the hinge as a center, so as to accomplish adjustment of spatial position of the imaging device; the first slide block is mounted on the vertical pole; a first polarization-hyperspectral imaging system is mounted on the first slide block, the first slide block can be driven by the lead screw to move up and down along the vertical pole, so that it drives the first polarization-hyperspectral imaging system to seek for an optimal detection position, to realize acquisition of polarization-hyperspectral image information in a front view direction;

The cantilever consists of a second base, a cross rod with a lead screw, and a second slide block, wherein the second base is fixed to the top part of a right side plate of the light box by screws, the second base is connected to the cross rod via a hinge, and the cross rod can swing up and down using the hinge as a center, so as to accomplish the adjustment of spatial position of the imaging device; the second slide block is mounted on the cross rod, a second polarization-hyperspectral imaging system is mounted on the second slide block, the second slide block can be driven by the lead screw to move left and right in the horizontal direction along the cross rod, so that it drives the second polarization-hyperspectral imaging system to seek for an optimal detection position, to realize acquisition of polarization-hyperspectral image information in a top view direction;

Wherein the light source system consists of visible light-near infrared light sources and cloud platforms, each cloud platform is mounted on the bottom end and top end of the vertical pole and the right end and left end of the vertical pole respectively, a visible light-near infrared light source is mounted on each cloud platform respectively, and the pitching angle of the visible light-near infrared light source can be set via the cloud platform, so as to perform imaging of the plant clearly in uniform light;

The double coordinate sample table is fixed to the geometrical center of the bottom plane of the light box, and a sample bracket is mounted on the top end of the vertical lead screw to place a sample to be detected; the sample bracket may be driven by the movement of the horizontal lead screw and the vertical lead screw to displace in the horizontal direction and the vertical direction at a constant speed, so that it works with an image acquisition control system to realize push-broom scanning and imaging with the first polarization-hyperspectral imaging system and the second polarization-hyperspectral imaging system;

Wherein the polarization-hyperspectral imaging system includes a pre-polarization filter, a polarization filter driving device, pre-filters, a filter switching device, a spectrograph, and an imaging system from the front side to the rear side respectively, the polarization filter is at the most front end of the entire system, and is driven by the polarization driving device to rotate within a 360° angle range, so that the polarization angle can be set freely, and the spectrograph and the imaging system can realize polarization angle setting and stepwise polarization information acquisition; 560 nm and 1,450 nm narrow-band filters are arranged behind the polarization filter, and the filters may be switched by means of a turning wheel, and can work with the spectrograph and the imaging system to realize acquisition of hyperspectral nutrition and water stress feature images of the crop sample in front view and top view;

The control system includes a control computer, a light source controller, an image acquisitor, and a movement controller;

Wherein the light source controller is connected to the visible light-near infrared light sources to realize control of light source at different light intensities with different light qualities;

The image acquisitor is connected to the two polarization-hyperspectral imaging systems and the control computer, and the control computer issues commands to realize image information acquisition and analysis with the polarization-hyperspectral imaging systems in front view and top view;

The movement controller is connected to the double coordinate sample table, the vertical arm, the cantilever, and the cloud platform; in addition, the movement controller is connected to the control computer, the control computer issues commands to realize control of the vertical and horizontal displacements of the double coordinate sample table, control the driving of the slide blocks for the vertical arm and the cantilever, and control the pitching angles of the cloud platform.

The present invention is directed to accurate fertilizer irrigation and application of nutrient solution at a dynamic mix ratio for crops in seedling stage in greenhouses. The technical solution involves: (1) accurate preparation technique for nutrient solution: accurate control of the concentration of the nutrient solution is realized by controlling the inflow rate of mother solution. Establish a relation model between concentration of nutrient solution and variable frequency control parameters at different mix ratios of nutrient solution, to provide a method for regulation and control of concentration of nutrient solution and irrigation and application amount; (2) irrigation amount and fertilizer amount decision making: by testing and studying the plant growth state under different environmental conditions in the greenhouse, such as light intensity, light accumulation, temperature and humidity, etc., in combination with the influences of water and fertilizes on information of plant growth, an optimal scheme of irrigation amount and fertilizer amount under the greenhouse conditions is decided; (3) in view of the problems of pipeline clogging and mix ratio error, etc. resulted from nutrient solution and impurity deposition in the fertilizer mixing and water and fertilizer irrigation and application process during facility production, auxiliary devices for mother solution mixing and agitation, and periodical pipeline flushing, etc. are designed and installed; in addition, by studying the law of solid fertilizer particle deposition under conditions with different nutrient solution mix ratios, agitation intervals are determined to reduce deposition of solid particles and improve utilization of the nutrient solution. On that basis, low-cost and integrated water and fertilizer regulation and control equipment suitable for solar greenhouses and steel-frame greenhouses is developed.

Compared with the prior art, the present invention has the following beneficial effects:

1. The present invention incorporates crop information detection techniques, greenhouse environment information detection techniques, accurate liquid fertilizer concentration preparation techniques, and water and fertilizer irrigation and application amount control decision-making techniques, and puts forward a fertilizer irrigation and application control strategy for crops that can accurately control irrigation time, and water and fertilizer irrigation amount and mix ratio according to main greenhouse environment information such as temperature, humidity, light, and water content in substrate, etc., in combination with crop nutrient information based on multi-information fusion. The present invention puts forward a multi-scale habitat information-based method for detecting and controlling water and fertilizer for crops in seedling stage, solves the problem of dynamic control of water and fertilizers according to the demand of the crops, overcomes the limitations of the existing fertilization control method merely based on information of environmental factors, and realizes fertilization on demand. Therefore, the method greatly reduces fertilizer consumption and labor cost, and greatly improves economic benefits.
2. The fertilization device provided in the present invention utilizes a frequency converter to control the rotation speed of a fertilization pump to regulate the flow rate in the liquid fertilizer pipeline, and transports the liquid fertilizer into a constant-pressure main pipeline, and thereby realizes real-time dynamic and accurate control of liquid fertilizer concentration and mix ratio and irrigation amount. With a frequency conversion technique based on crop habitat information feedback, the device realizes automatic water and fertilizer mixing and variable irrigation operation in the greenhouse. At present, there is no such constant-pressure and variable frequency water and fertilizer mixing control technique based on crop habitat information feedback in greenhouse vegetable production yet.
3. The main reason for liquid fertilizer deposition and pipeline clogging in a solid fertilizer agitation/liquid fertilizer irrigation and application mode lies in the inhomogeneity and high viscosity of the agitated liquid fertilizer in the mixing tank, which will inevitably result in heavy deposition and accumulation on the wall of the pipeline in long-time operation and storage and cause operation failures and shortened service life of the system. By adding auxiliary fertilizer mixing and agitation devices that are based on the feedback of inhomogeneity between upper layer and lower layer of liquid fertilizer to improve the homogeneity, the deposition rate of solid particles is greatly decreased; in addition, working with pipeline filter devices, the auxiliary devices not only decrease the labor intensity of manual agitation, but also greatly reduce equipment failures, improve the operating efficiency of the fertilizer distributor, reduce costs, and improve economic benefits.
4. The present invention utilizes micro-CT to scan the micro-morphological features of feature variables of the crop under nutrition and water stress, such as pores, cavernous body, palisade tissue, cilia, vascular bundle, volume of root system, density of main root and root hair, etc., and utilizes double polarization-hyperspectral imaging systems to obtain the macro-morphological features of plants under water stress, such as canopy width, plant height and leaf inclination angle, etc., and distribution of leaf vein, average greyscale, and shadow area of leaf margin at 560 nm and 1,450 nm hyperspectral nutrition and water-sensitive wavelengths, polarization state, Stock vector, and Muller matrix variables, etc. in 560 nm and 1,450 nm feature images at 0°, 45°, 90°, 135°, and 180° characteristic polarization angles, and macro-morphological features of plant growth such as plant volume, leaf area, stem diameter, and plant height acquired by three-dimensional laser scanning system; fuses the internal and external structures, above-ground and underground, macro and micro morphological features and the characteristic wavelength image and polarization state of the crop under water stress to utilize their complementary advantages, and thereby realizes comprehensive and accurate extraction and accurate and quantitative analysis of nutrition and water stress characteristics of the crop in seedling stage, and provides a scientific basis for integrated scientific management of water and fertilizer in facilities.

1—main water inflow pipeline; 2—filter; 3—water inflow pump; 4—water inflow solenoid valve; 5—fertilizer outflow pipeline; 6—fertilization solenoid valve; 7—EC sensor; 8—digital display pressure meter; 9—frequency converter; 10—control cabinet; 11—contactor; 12—environmental temperature transmitter; 13—environmental humidity transmitter; 14—environmental lighting transmitter; 15—substrate water content transmitter; 16—analog module; 17—air-break power switch; 18—PLC controller; 19—pH sensor; 20—liquid level sensor; 21—touch display screen; 22—agitating motor; 23—fertilizer mixing tank; 24—fertilization pump; 25—pressure transmitter; 26—fertilization pipeline; 27—rotating sample bracket; 29—X-ray emitter; 30—computer; 32—double coordinate sample table; 33—vertical arm; 33-1—first base; 33-2—vertical pole; 33-3—first slide block; 34—cantilever; 34-1—second base; 34-2—hanger rod; 34-3—second slide block; 35—polarization-hyperspectral imaging system; 35-1—first polarization-hyperspectral imager; 35-2—second polarization-hyperspectral imager; 36 cloud platform; 37—visible light-near infrared light source; 38—movement controller; 39—image acquisitor; 40—light source controller; 41—control computer; 42—light box; 43—PC; 44—FireWire adapter; 45—FireWire cable; 46—handheld three-dimensional scanning head; 47—power supply module.

EMBODIMENTS

The following is a further explanation of the invention in combination with the attached drawings and specific embodiments, but the protection scope of the invention is not limited to this.

Figure 1:
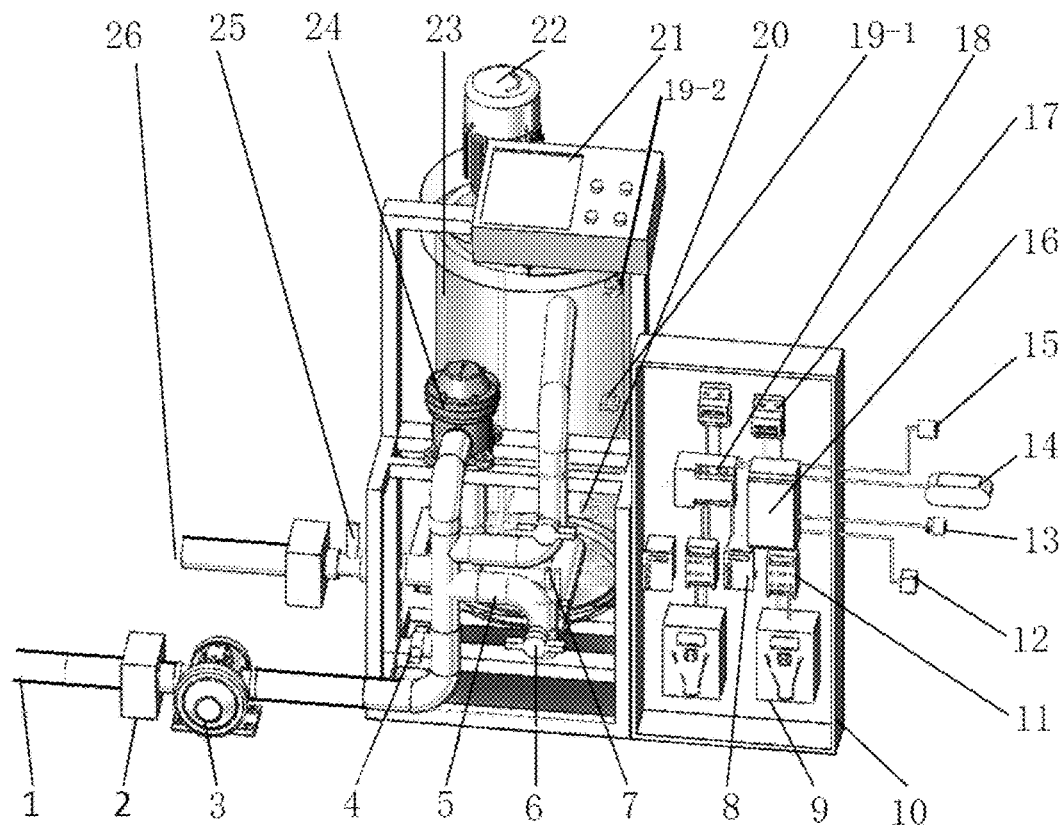
FIG. 1 is a schematic structural diagram of the device for water and fertilizer detection and control for crops in seedling stage according to the present invention.

FIG. 1 shows a water and fertilizer detection and control device for crops at seedling stage based on multi-scale habitat information of the present invention. The fertilization mechanism mainly includes a main water inflow pipeline 1, a filter 2, a water inflow pump 3, a water inflow solenoid valve 4, a fertilizer outflow pipeline 5, a fertilization solenoid valve 6, an agitating motor 22, a fertilizer mixing tank 23, a fertilization pump 24, and a fertilizer outflow pipe 26; wherein, one end of the main water inflow pipeline 1 is connected to a water source, the other end of the main water inflow pipeline 1 is connected to the filter 2, the water outlet of the filter 2 is connected to the water inflow pump 3 to provide a basic water source for the water and fertilizer supply system, the water inflow solenoid valve 4 is connected between the outlet pipeline of the water inflow pump 3 and the fertilizer mixing pipeline to control the connection/disconnection of the water source pipeline; the fertilization pump 24 is connected to the top part of the fertilizer mixing tank 23 through a pipeline, and a fertilization solenoid valve 6 is arranged between them to realize the control of the connection/disconnection of the fertilization pipeline; the agitating motor 22 is mounted on the top of the fertilization tank 23, and agitating blades are mounted on the tail end of the output shaft of the agitating motor 22 and is driven by the motor to realize the operation of mixing and uniformly agitating the solid fertilizer particles;

The information acquisition system includes an environmental temperature transmitter 12, an environmental humidity transmitter 13, an environmental lighting transmitter 14, a substrate water content transmitter 15, an EC sensor 7, two pH sensors 19-1 and 19-2, a liquid level sensor 21, a pressure transmitter 25, a crop information detection system, and an A/D conversion analog input module 16; wherein, the environmental temperature transmitter 12, the environmental humidity transmitter 13, and the environmental lighting transmitter 14 are mounted in the greenhouse, the substrate water content transmitter 15 is mounted in the substrate in the crop pot, and the environmental temperature transmitter 12, the environmental humidity transmitter 13, the environmental lighting transmitter 14, and the substrate water content transmitter 15 are connected to the analog module 16 respectively.

The EC sensor 7 is connected in the pipeline of a fertilizer distributor to detect the concentration of the nutrient solution, and the output end of the EC sensor 7 is connected to the input end of the analog input module 16; one of the two pH sensors 19-1 is mounted at 10 cm from the liquid level in the fertilizer mixing tank and the other one 19-2 is mounted at 20 cm from the bottom of the fertilizer mixing tank 23, and the two pH sensors 19-1 and 19-2 are respectively connected to the input end of the analog module; by comparing the differences between the two pH sensors, the degree of homogeneity of fertilizer agitation is judged, the required rotation speed of the agitating motor is judged, and the agitating motor and the agitating device are started or stopped automatically.

The liquid level sensor 20 is arranged at the bottom of the fertilizer mixing tank 23, and the signal output end of the liquid level sensor is also connected to the input end of the analog module 16; the liquid level is judged based on a principle of pressure difference under water; the pressure transmitter 25 is connected at the middle part of the main pipeline to judge the pressure in the main pipeline, and the output end of the pressure transmitter 25 is connected to the input end of the analog module 16.

Figure 2:
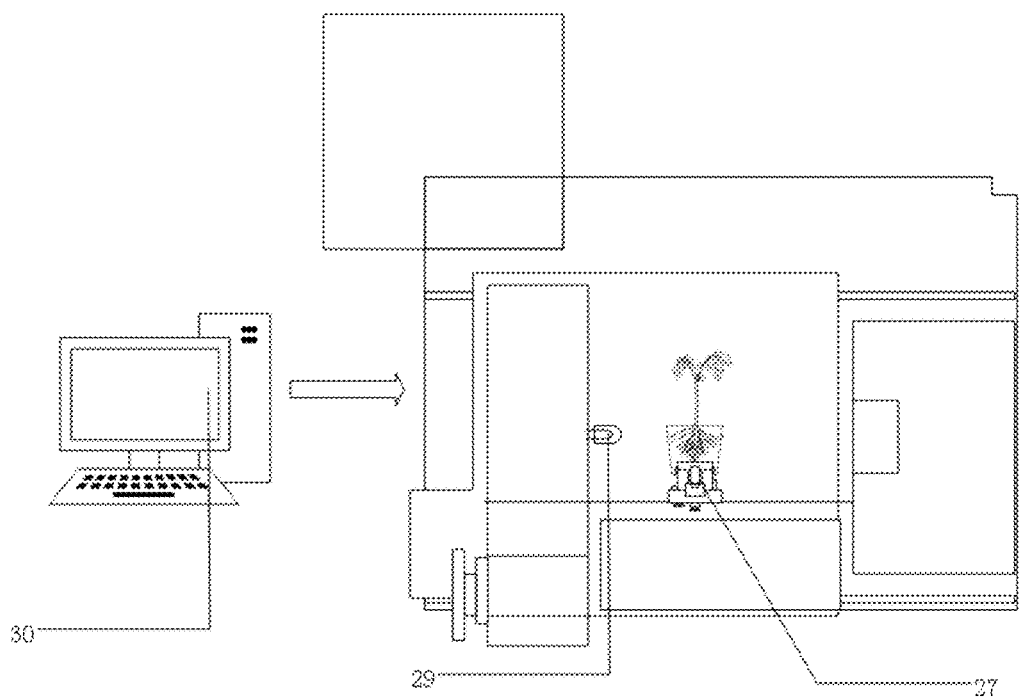
FIG. 2 is a schematic structural diagram of the micro-CT device used in the present invention.

The crop information detection system includes a micro-CT scanning system, a polarization-hyperspectral imaging system, and a three-dimensional laser scanning system;

The micro-CT scanning and imaging system is shown in FIG. 2, the rotating sample bracket 27 is fixed to the bottom of the detection sample chamber by screws at the four corners of a base, a rotating shaft is mounted at the geometrical center of the base of the rotating sample bracket 1, and a round sample bracket is mounted and fixed at the tail end of the rotating shaft; during the detection, the rotating shaft drives the rotating sample bracket to rotate within 360° angle range, at the same time, an X-ray emitter 29 fixed to the middle part of the emission chamber accomplishes a CT slice scanning process of the sample by pitching motion.

Figure 3:
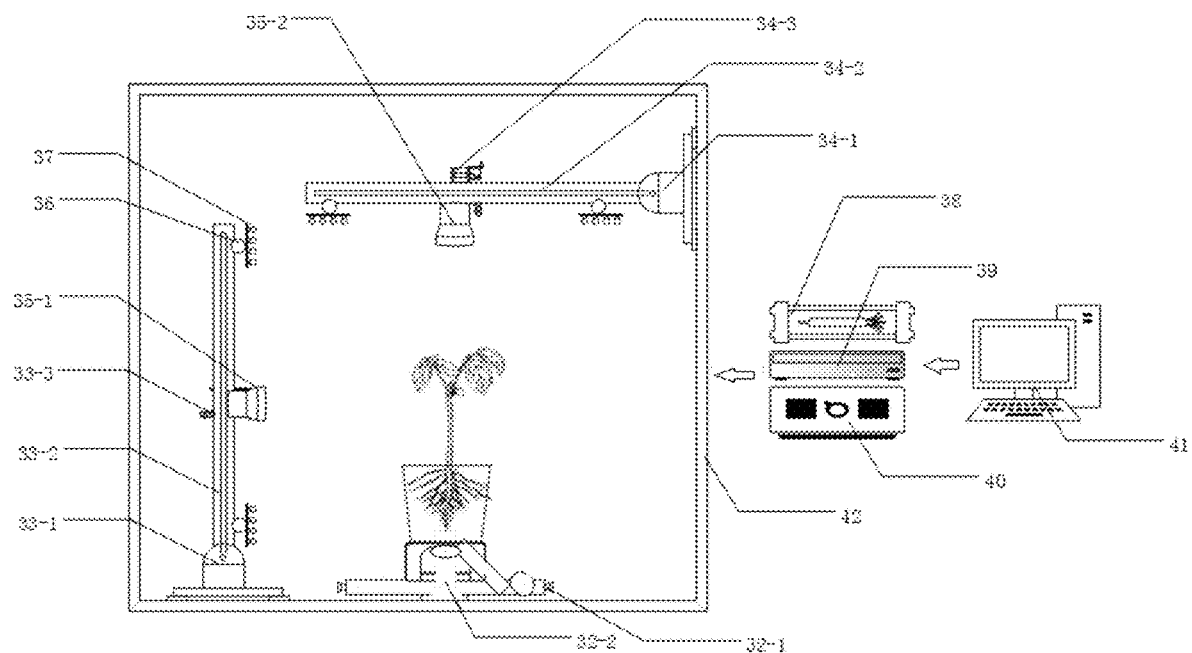
FIG. 3 is a schematic structural diagram of the polarization-hyperspectral imaging system used in the present invention.

FIG. 3 is a polarization-hyperspectral imaging system designed for sample collection applied by the invention includes a control system, a double coordinate sample table 32, an image acquisition system, and a light source system. Wherein the image acquisition system includes two polarization-hyperspectral imaging systems 35, an image acquisitor 38, a vertical arm 33, and a cantilever 34; the vertical arm 33 consists of a first base 33-1, a vertical pole 33-2 with a lead screw, and a first slide block 33-3, wherein the first base 33-1 is fixed to the left side of the bottom of a light box 42 by screws, the top part of the first base 33-1 is connected to the vertical pole 33-2 via a hinge, and the vertical pole 33-2 can swing left and right using the hinge as a center, so as to accomplish spatial position adjustment of the imaging device; the first slide block 33-3 is mounted on the vertical pole 33-2; a first polarization-hyperspectral imaging system 35-1 is mounted on the first slide block 33-3, the first slide block 33-3 can be driven by the lead screw to move up and down along the vertical pole 33-2, so that it drives the first polarization-hyperspectral imaging system 35-1 to seek for an optimal detection position, to realize the acquisition of polarization-hyperspectral image information in a front view direction;

The cantilever 34 consists of a second base 34-1, a cross rod 34-2 with a lead screw, and a second slide block 34-3, wherein the second base 34-1 is fixed to the top part of a right side plate of the light box 42 by screws, the second base 34-1 is connected to the cross rod 34-2 via a hinge, and the cross rod 34-2 can swing up and down using the hinge as a center, so as to accomplish the adjustment of spatial position of the imaging device; the second slide block 34-3 is mounted on the cross rod 34-2, a second polarization-hyperspectral imaging system 35-2 is mounted on the second slide block 34-3, the second slide block 34-3 can be driven by the lead screw to move left and right in the horizontal direction along the cross rod 34-2, so that it drives the second polarization-hyperspectral imaging system 35-2 to seek for an optimal detection position, to realize acquisition of polarization-hyperspectral image information in a top view direction.

Wherein the light source system consists of visible light-near infrared light sources 37 and cloud platforms 36, each cloud platform 36 is mounted on the bottom end and top end of the vertical pole 33-2 and the right end and left end of the vertical pole 34-2 respectively, a visible light-near infrared light source 37 is mounted on each cloud platform respectively, and the pitching angle of the visible light-near infrared light source 37 can be set via the cloud platform 36, so as to perform imaging of the plant clearly in uniform light.

The double coordinate sample table 32 is fixed to the geometrical center of the bottom plane of the light box 42, and a sample bracket is mounted on the top end of the vertical lead screw 32-1 to place a sample to be detected; the sample bracket may be driven by the movement of the horizontal lead screw 32-2 and the vertical lead screw 32-1 to displace in the horizontal direction and the vertical direction at a constant speed, so that it works with an image acquisition control system to realize push-broom scanning and imaging with the first polarization-hyperspectral imaging system 35-1 and the second polarization-hyperspectral imaging system 35-2.

Wherein the polarization-hyperspectral imaging system 35 includes a pre-polarization filter, a polarization filter driving device, pre-filters, a filter switching device, a spectrograph, and an imaging system from the front side to the rear side respectively, the polarization filter is at the most front end of the entire system, and is driven by the polarization driving device to rotate within a 360° angle range, so that the polarization angle can be set freely, and the spectrograph and the imaging system can realize polarization angle setting and stepwise polarization information acquisition; 560 nm and 1,450 nm narrow-band filters are arranged behind the polarization filter, and the filters may be switched by means of a turning wheel, and can work with the spectrograph and the imaging system to realize acquisition of hyperspectral nutrition and water stress feature images of the crop sample in front view and top view; The control system includes a control computer 41, a light source controller 40, an image acquisitor 39, and a movement controller 38; Wherein the light source controller 40 is connected to the visible light-near infrared light sources 37 to realize control of light source at different light intensities with different light qualities; The image acquisitor 39 is connected to the two polarization-hyperspectral imaging systems 38 and the control computer 41, and the control computer 41 issues commands to realize image information acquisition and analysis with the polarization-hyperspectral imaging systems 35 in front view and top view; The movement controller 38 is connected to the double coordinate sample table 32, the vertical arm 33, the cantilever 34, and the cloud platform 36; in addition, the movement controller 38 is connected to the control computer 41, the control computer 41 issues commands to realize control of the vertical and horizontal displacements of the double coordinate sample table 32, control the driving of the slide blocks for the vertical arm 33 and the cantilever 34, and control the pitching angles of the cloud platform 36.

Figure 4:
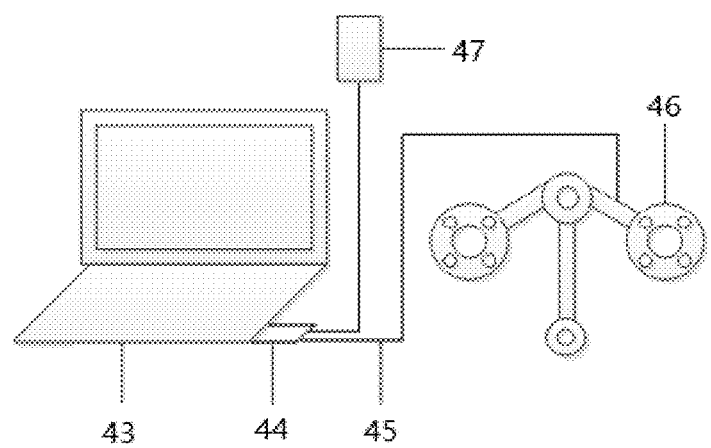
FIG. 4 is a schematic structural diagram of the three-dimensional laser scanning system used in the present invention.

As shown in FIG. 4, 3D scanning imaging system consists of PC 43, FireWire 44, FireWire adapter cable 45, handheld 3d scanner head 46 and power supply module 47.

Wherein Handheld 3d scanner head 46 connects to FireWire adapter 44 via FireWire cable 45 and connect to the PC via the FireWire adapter 44. The control and information collection of the handheld 3d scanning head 46 is realized by PC software, the power module 47 supplies power to the PC by connecting to the FireWire adapter 44; The power module 47 is connected to the handheld 3d scanning head 46 to provide power for the handheld 3d scanning head 46.

The control system includes a PLC controller 18, a touch display screen 21, a frequency converter 9, and an actuator, wherein the touch display screen 21 is connected to the PLC controller 18 for man-machine interaction to input control mode and information on plant growth state; wherein the input end of the frequency converter 9 is connected to the output end of the PLC controller 18, the output end of the frequency converter 9 is connected to the fertilization pump 24, and the analog module 16 is connected to the PLC controller 18, to realize the control of multi-channel information acquisition of the PLC controller 18 on the information acquisition system;

PLC controller 18 is built with a multi-feature fusion model for accurate quantitative detection of nitrogen and water stress, a model for fertilizer and irrigation amount, a model for relationship between speed of fertilizer pump and fertilizer flow, and a model for relationship between speed of fertilizer pump and fertilizer flow, and judging the current state and degree of water stress and nitrogen stress of the plants with the PLC control system according to the accurate and quantitative nitrogen and water stress detection model with multi-feature fusion; then, utilizing the PLC 18 to control the output frequency of the frequency converter and thereby controlling the rotation speed of the fertilization pump on the basis of the model of fertilization and irrigation amount, in combination with the relation model between fertilization flow rate and fertilization amount, and between rotation speed of fertilization pump and fertilization flow rate, to realize accurate regulation and control of fertilization mix ratio and irrigation volume.

Figure 5:
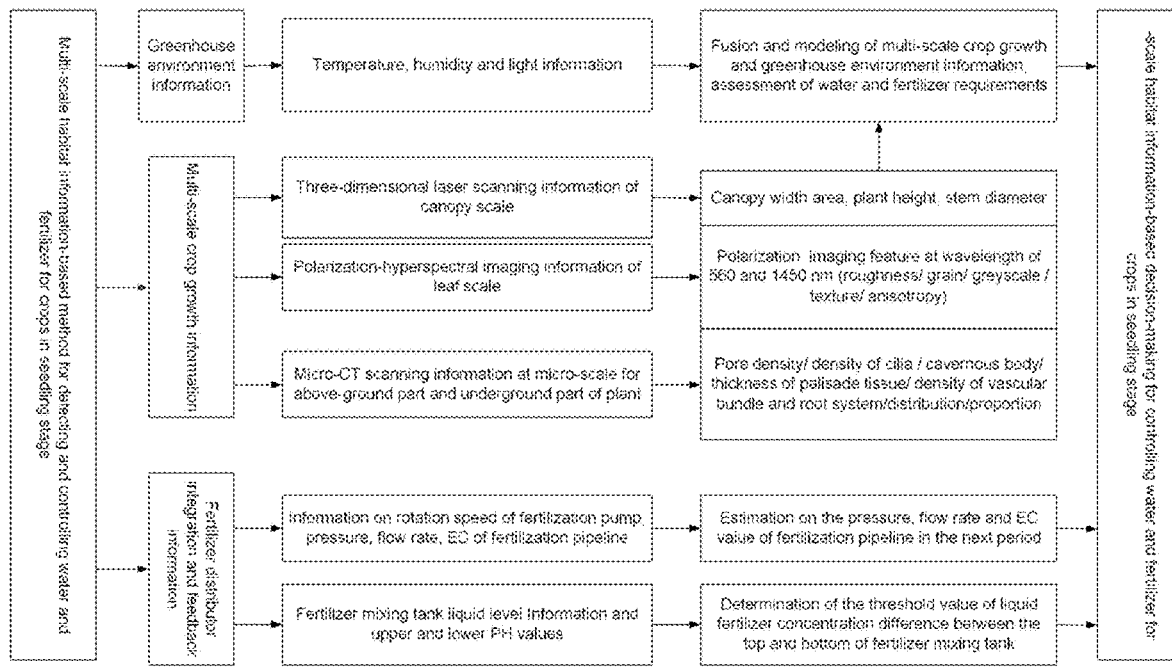
FIG. 5 is a flow chart of the multi-scale habitat information-based method for detecting and controlling water and fertilizer for crops in seedling stage according to the present invention.
Figure 6:
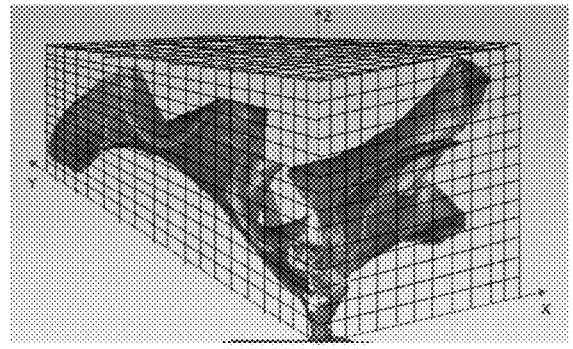
FIG. 6 is a three-dimensional spatial grid model of lettuce.
Figure 7:
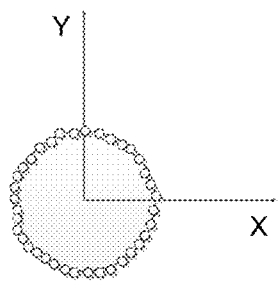
FIG. 7 shows the stem diameter coordinates of lettuce.

As shown in FIG. 5, a multi-scale habitat information-based method for detecting and controlling water and fertilizer for crops in seedling stage, including the following steps:

Step 1: Using a standard nutrient solution formulation, utilizing pearlite as a culture substrate, employing soilless cultivation to plant greenhouse vegetable crops, and managing the plants with standardized greenhouse management methods to ensure normal supply of nutrient elements and water to the crops in seedling stage;

Step 2: After one week of planting, selecting plants for sample cultivation under water stress and nitrogen stress;

(1) One week after transplanting, water supply was divided into 5 different levels according to the standard supply of 100%, 80%, 60%, 40% and 20% under the condition of unchanged nutrient elements. 20 samples were collected from each level and 100 samples were collected for water stress sample cultivation.

(2) One week after transplanting, nitrogen supply was divided into four different levels of 200%, 100%, 50% and 25% of the standard supply under the condition of maintaining adequate water supply, 20 samples for each level and 80 samples in total for nitrogen stress sample cultivation.

Step 3: Sample 3 days after water stress in seedling stage, nutrition stress respectively in 7 days, 15 days and 21 days after the stress of microscale sample micro-CT, compose a blade dimension polarization—highlights as scanning and canopy scale plant canopy of 3 d scanning imaging information collection, at the same time to obtain the greenhouse crop growth environment of temperature, humidity, light intensity and the moisture content of the cultivation matrix information. The above information is obtained according to the following steps:

1) Environmental information collection steps for crop growth: temperature transmitter, humidity transmitter, light intensity transmitter and moisture content transmitter are adopted to obtain the temperature, humidity, light and matrix moisture content information of the growing environment of crops.

2) the micro-CT detection at micro-scale includes the following steps:

①  Placing plant samples on the rotating sample bracket 7 in the sample chamber of the Micro-CT scanning system, starting the Micro-CT scanning system by controlling computer 30 and carrying out scanning, to acquire CT profiles of the samples;

②  Using IPL software to select the boundaries and contours in the CT images of the samples;

③  Selecting different tomography sections for image analysis, adjusting the high and low thresholds according to the different grayscale levels of the target in the CT image, selecting a threshold range for the target, and binarizing the CT image of the target sample;

④  Using the IPL software in combination with target image analysis to obtain feature parameters of the plant, including pore density of leaves and stems, thickness of cavernous body, density of palisade tissue and cilia, cross-sectional structure of vascular bundle, and grayscale of the CT image, etc.;

⑤  Removing the pearlite substrate on the basis of the selected boundaries and thresholds, generating a three-dimensional image of the root system, and carrying out IPL language to export parameters including volume of root system, and density and distribution of main root and root hair.

3) The polarization-hyperspectral scanning and imaging detection at leaf scale includes the following steps:

After obtaining micro-ct scanning images and completing feature extraction, the samples were successively taken out for polarization-hyperspectral image scanning imaging, and the following steps were performed:

①  Placing samples on the double coordinate sample table 32 of the polarization-hyperspectral imaging system, setting the wavelength range of the visible light-near infrared light source system 37 to 300 to 2,200 nm, setting the light intensity range to 6,500 lux, adjusting the geometrical center of the imaging system to be in line with the geometrical center of the displacement table in X-axis (horizontal axis) and Z-axis (vertical axis), and carrying out the scanning and imaging of polarization-hyperspectral image;

②  Using two hyperspectral imaging systems 35-1 and 35-2 with pre-polarization filters, and setting the sampling polarization angles of the polarization filters to 0°, 45°, 90°, 135°, and 180° respectively; using hyperspectral pre-filters with 560 nm and 1,450 nm transmission wavelengths, and performing push-broom polarization-hyperspectral scanning and imaging in the horizontal direction and the vertical direction respectively, to obtain front-view and top-view polarization-hyperspectral feature images;

③  Extracting a hyperspectral feature images of the sample under nutrition and water stress in front view and top view fields, and extracting canopy width, plant height and leaf inclination angle images of the plant, by means of coordinate matching and front-view/top-view feature image fusion;

④  Extracting a hyperspectral feature image of the canopy at the characteristic wavelength, extracting feature parameters such as distribution of leaf vein, average greyscale, and shadow area of leaf margin, etc. of the leaf surface at 560 nm and 1,450 nm hyperspectral nutrition and water sensitive wavelengths, based on the 560 nm and 1,450 nm pre-filters;

⑤  Extracting the polarization state, Stock vector, and Muller matrix variables of the pant sample under nitrogen and water stress, based on the acquired 560 nm and 1,450 nm polarization-hyperspectral image at 0°, 45°, 90°, 135°, and 180° characteristic polarization angles.

4) the three-dimensional laser scanning and imaging detection at canopy scale includes the following steps:

After micro-ct scanning images are obtained and feature extraction is completed, the samples are taken successively for polarization-hyperspectral image scanning imaging: before 3d laser scanning data collection, the laser power, shutter time and resolution of the acquisition software of the scanner sensor should be determined in advance to ensure the clarity of the 3d model. After analysis and comparison, the laser power was set to 65%, the shutter time was set to 7.2 ms, and the resolution was set to 0.50 mm. The 3d morphology of the collected plants was set under the setting parameters.

(1) First, sticking black outline high-reflection target spots in 6 mm diameter above the crop leaves to be scanned and the planting vessel, with the minimum distance between every two target spots controlled to 20 mm when sticking the reflection target spots, in view that the surfaces of the leaves are curved;

(2) Operating the scanning system, using the three-dimensional laser scanner to measure a calibration plate to correct the parameters of sensors, so as to ensure the data acquisition accuracy;

(3) Finally, acquiring three-dimensional data of all crop samples sequentially by handheld scanning.

Step 4: Conventional physical and chemical testing was carried out: the dry and wet weight of the sample was weighed to determine the true water content of the plant; The total nitrogen content of samples was determined by using AutoAnalyzer3 continuous flow analyzer produced by SEAL company in the UK. The stomatal and cilium densities, the thickness of spongy and palisade tissues, the distribution density of vascular bundles and the diameter of vascular bundles were obtained by scanning electron microscope and ultra depth of field 3D microimaging.

Step 5: Carrying out normalization of the micro-CT feature variables, polarization-hyperspectral image feature variables, and three-dimensional scanning and imaging feature variables extracted in step 3, to unify the range of the feature values to 0 to 1;

Step 6: Carrying out feature dimension reduction and optimization of the normalized feature parameters extracted in step 5 by means of principal component analysis in combination with piecewise and stepwise regression method; based on a principle of correlation and independence, at a significance level $\alpha=0.005$, keeping a variable if $F>4.35$ when the variable is taken into the model, weeding out a variable if $F<2.95$ in the model during the discrimination, while maintaining $R2>0.9$; carrying out feature optimization based on optimization principles of maximum correlation, minimum multi-collinearity, and minimum relative detection error, to obtain optimal feature variables as feature variables for diagnosis of water stress and nitrogen stress of the plants;

Step 7: Utilizing a support vector machine regression (SVR) method to carry out the fusion of feature layer, and establishing an accurate and quantitative nitrogen and water stress detection model with multi-feature fusion based on feature variables of the pores, cavernous body, palisade tissue, cilia, vascular bundle, volume of root system, density of main root and root hair acquired with the micro-CT system, the canopy width, plant height, leaf inclination angle, and distribution of leaf vein, average greyscale and shadow area of leaf margin at 560 nm and 1,450 nm hyperspectral water-sensitive wavelengths acquired with the polarization-hyperspectral imaging system, the polarization state, Stock vector, and Muller matrix variables of plants in the 560 nm and 1,450 nm feature images at 0°, 45°, 90°, 135°, and 180° characteristic polarization angles; and the feature variables of plant volume, leaf area, and stem diameter obtained by three-dimensional laser scanning, and inputting the accurate and quantitative nitrogen and water stress detection model with multi-feature fusion into a PLC control system;

Step 8: Using the temperature, humidity and light information of the plant growth environment and the information on water content in the substrate acquired in step 3 to perform statistics, analysis, and calculation of accumulative value of temperature and accumulative value of light since the time of planting, and, in combination with the information on water content in the substrate and environmental temperature, humidity and lighting information, calculating the transpiration of the plants; on that basis, carrying out tracking and continuous detection of nutrition and water stress of the crops on the basis of the acquired micro-CT images, polarization-hyperspectral image features, and optimal feature variables of three-dimensional laser scanning and imaging, to obtain a model of fertilization and irrigation amount for plants, and inputting the model into the PLC control system;

Step 9: Under a condition of constant pressure in the main pipeline, establishing a relation model between fertilization flow rate and fertilization amount, and between rotation speed of fertilization pump and fertilization flow rate, and inputting the relation model between fertilization flow rate and fertilization amount and between rotation speed of fertilization pump and fertilization flow rate into the PLC control system;

Step 10: Acquiring micro-CT images, polarization-hyperspectral image features, and feature parameters of three-dimensional laser scanning and imaging that characterize the growth state of the plants according to step 3, and judging the current state and degree of water stress and nitrogen stress of the plants with the PLC control system according to the accurate and quantitative nitrogen and water stress detection model with multi-feature fusion; then, utilizing the PLC to control the output frequency of the frequency converter and thereby controlling the rotation speed of the fertilization pump on the basis of the model of fertilization and irrigation amount, in combination with the relation model between fertilization flow rate and fertilization amount, and between rotation speed of fertilization pump and fertilization flow rate, to realize accurate regulation and control of fertilization mix ratio and irrigation volume.

While some preferred embodiments of the present invention are described above, the present invention is not limited to those embodiments. Any obvious improvement, replacement, or variation that can be made by those skilled in the art without departing from the spirit of the present invention shall be deemed as falling in the protection scope of the present invention.

The invention claimed is:

1. A multi-scale habitat information-based method for detecting and controlling water and fertilizer for crops in seedling stage, comprising the following steps:

(1) using a standard nutrient solution formulation, utilizing pearlite as a culture substrate, employing soilless cultivation to plant greenhouse vegetable crops, and managing the plants with standardized greenhouse management methods to ensure normal supply of nutrient elements and water to the crops in seedling stage;

(2) after one week of planting, selecting plants for sample cultivation under water stress and nitrogen stress;

(3) carrying out continuous plant growth state detection and information acquisition of the samples in seedling stage under water stress and nutrition stress respectively through micro-CT scanning at micro-scale, polarization-hyperspectral imaging and scanning at leaf scale, and three-dimensional plant canopy scanning and imaging at canopy scale, and acquiring plant habitat information at the same time;

(4) carrying out conventional physical and chemical detections: weighing dry and wet weight of the samples to determine the true value of water content in the plants; measuring the total nitrogen content in the samples with a Kjeldahl method; using SEM and 3D micro-imaging techniques with ultra-depth of field to obtain measured values of density of pore and cilia, thickness of cavernous body and palisade tissue, and distribution density of vascular bundle and diameter of fibrous canal of the plants;

(5) carrying out normalization of the micro-CT feature variables, polarization-hyperspectral image feature variables, and three-dimensional scanning and imaging feature variables extracted in step (3), to unify the range of the feature values to 0 to 1;

(6) carrying out feature dimension reduction and optimization of the normalized feature parameters extracted in step (5) by means of principal component analysis in combination with piecewise and stepwise regression method; based on a principle of correlation and independence, at a significance level $\alpha=0.005$, keeping a variable if $F>4.35$ when the variable is taken into the model, weeding out a variable if $F<2.95$ in the model during the discrimination, while maintaining $R^2>0.9$; carrying out feature optimization based on optimization principles of maximum correlation, minimum multi-collinearity, and minimum relative detection error, to obtain optimal feature variables as feature variables for diagnosis of water stress and nitrogen stress of the plants;

(7) utilizing a support vector machine regression (SVR) method to carry out the fusion of feature layer, and establishing an accurate and quantitative nitrogen and water stress detection model with multi-feature fusion based on feature variables of the pores, cavernous body, palisade tissue, cilia, vascular bundle, volume of root system, density of main root and root hair acquired with the micro-CT system, the canopy width, plant height, leaf inclination angle, and distribution of leaf vein, average greyscale and shadow area of leaf margin at 560 nm and 1,450 nm hyperspectral water-sensitive wavelengths acquired with the polarization-hyperspectral imaging system, the polarization state, Stock vector, and Muller matrix variables of plants in the 560 nm and 1,450 nm feature images at 0°, 45°, 90°, 135°, and 180° characteristic polarization angles; and the feature variables of plant volume, leaf area, and stem diameter obtained by three-dimensional laser scanning, and inputting the accurate and quantitative nitrogen and water stress detection model with multi-feature fusion into a PLC control system;

(8) using the temperature, humidity and light information of the plant growth environment and the information on water content in the substrate acquired in step (3) to perform statistics, analysis, and calculation of accumulative value of temperature and accumulative value of light since the time of planting, and, in combination with the information on water content in the substrate and environmental temperature, humidity and lighting information, calculating the transpiration of the plants; on that basis, carrying out tracking and continuous detection of nutrition and water stress of the crops on the basis of the acquired micro-CT images, polarization-hyperspectral image features, and optimal feature variables of three-dimensional laser scanning and imaging, to obtain a model of fertilization and irrigation amount for plants, and inputting the model into the PLC control system;

(9) under a condition of constant pressure in the main pipeline, establishing a relation model between fertilization flow rate and fertilization amount, and between rotation speed of fertilization pump and fertilization flow rate, and inputting the relation model between fertilization flow rate and fertilization amount and between rotation speed of fertilization pump and fertilization flow rate into the PLC control system;

(10) acquiring micro-CT images, polarization-hyperspectral image features, and feature parameters of three-dimensional laser scanning and imaging that characterize the growth state of the plants according to step (3), and judging the current state and degree of water stress and nitrogen stress of the plants with the PLC control system according to the accurate and quantitative nitrogen and water stress detection model with multi-feature fusion; then, utilizing the PLC to control the output frequency of the frequency converter and thereby controlling the rotation speed of the fertilization pump on the basis of the model of fertilization and irrigation amount, in combination with the relation model between fertilization flow rate and fertilization amount, and between rotation speed of fertilization pump and fertilization flow rate, to realize accurate regulation and control of fertilization mix ratio and irrigation volume.

2. The multi-scale habitat information-based method for detecting and controlling water and fertilizer for crops in seedling stage according to claim 1, wherein, the habitat information comprises temperature, humidity, and light intensity information of the plant habitat in the greenhouse and information on water content in the culture substrate, and is acquired with temperature transmitter, humidity transmitter, light intensity transmitter, and water content transmitter.

3. The multi-scale habitat information-based method for detecting and controlling water and fertilizer for crops in seedling stage according to claim 1, wherein, the micro-CT detection at micro-scale comprises the following steps:

(1) placing plant samples on the rotating sample bracket in the sample chamber of the Micro-CT scanning system, starting the Micro-CT scanning system and carrying out scanning, to acquire CT profiles of the samples;

(2) using IPL software to select the boundaries and contours in the CT images of the samples;

(3) selecting different tomography sections for image analysis, adjusting the high and low thresholds according to the different grayscale levels of the target in the CT image, selecting a threshold range for the target, and binarizing the CT image of the target sample;

(4) using the IPL software in combination with target image analysis to obtain feature parameters of the plant, including pore density of leaves and stems, thickness of cavernous body, density of palisade tissue and cilia, cross-sectional structure of vascular bundle, and grayscale of the CT image, etc.;

(5) removing the pearlite substrate on the basis of the selected boundaries and thresholds, generating a three-dimensional image of the root system, and carrying out IPL language to export parameters including volume of root system, and density and distribution of main root and root hair.

4. The multi-scale habitat information-based method for detecting and controlling water and fertilizer for crops in seedling stage according to claim 1, wherein, the polarization-hyperspectral scanning and imaging detection at leaf scale comprises the following steps:

(1) placing samples on the double coordinate sample table of the polarization-hyperspectral imaging system, setting the wavelength range of the visible light-near infrared light source system to 300 to 2,200 nm, setting the light intensity range to 6,500 lux, adjusting the geometrical center of the imaging system to be in line with the geometrical center of the displacement table in X-axis (horizontal axis) and Z-axis (vertical axis), and carrying out the scanning and imaging of polarization-hyperspectral image;

(2) using two hyperspectral imaging systems with pre-polarization filters, and setting the sampling polarization angles of the polarization filters to 0°, 45°, 90°, 135°, and 180° respectively; using hyperspectral pre-filters with 560 nm and 1,450 nm transmission wavelengths, and performing push-broom polarization-hyperspectral scanning and imaging in the horizontal direction and the vertical direction respectively, to obtain front-view and top-view polarization-hyperspectral feature images;

(3) extracting a hyperspectral feature images of the sample under nutrition and water stress in front view and top view fields, and extracting canopy width, plant height and leaf inclination angle images of the plant, by means of coordinate matching and front-view/top-view feature image fusion;

(4) extracting a hyperspectral feature image of the canopy at the characteristic wavelength, extracting feature parameters such as distribution of leaf vein, average greyscale, and shadow area of leaf margin, etc. of the leaf surface at 560 nm and 1,450 nm hyperspectral nutrition and water sensitive wavelengths, based on the 560 nm and 1,450 nm pre-filters;

(5) extracting the polarization state, Stock vector, and Muller matrix variables of the pant sample under nitrogen and water stress, based on the acquired 560 nm and 1,450 nm polarization-hyperspectral image at 0°, 45°, 90°, 135°, and 180° characteristic polarization angles.

5. The multi-scale habitat information-based method for detecting and controlling water and fertilizer for crops in seedling stage according to claim 1, wherein, the three-dimensional laser scanning and imaging detection at canopy scale comprises the following steps:

(1) first, sticking black outline high-reflection target spots in 6 mm diameter above the crop leaves to be scanned and the planting vessel, with the minimum distance between every two target spots controlled to 20 mm when sticking the reflection target spots, in view that the surfaces of the leaves are curved;

(2) operating the scanning system, using the three-dimensional laser scanner to measure a calibration plate to correct the parameters of sensors, so as to ensure the data acquisition accuracy;

(3) finally, acquiring three-dimensional data of all crop samples sequentially by handheld scanning.

6. The multi-scale habitat information-based method for detecting and controlling water and fertilizer for crops in seedling stage according to claim 5, wherein, in the three-dimensional laser scanning and imaging detection process, a laser power is set to 65%, a shutter time is set to 7.2 ms, and a resolution is set to 0.50 mm.

* * * * *